Jan. 29, 1929.
C. T. PFLUEGER
1,700,332
STRIKER SPOON
Filed Feb. 23, 1926
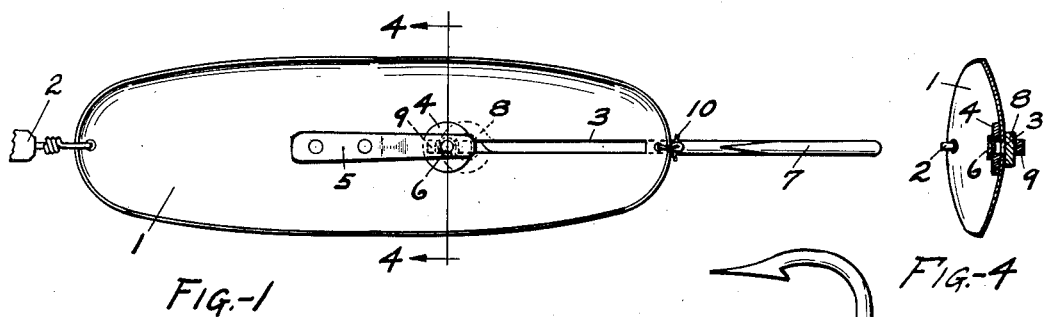
Fig.-1
Fig.-4
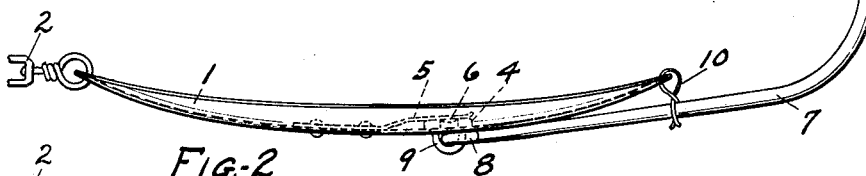
Fig.-2
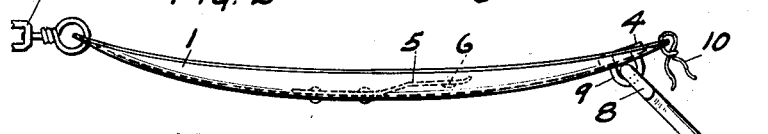
Fig.-3
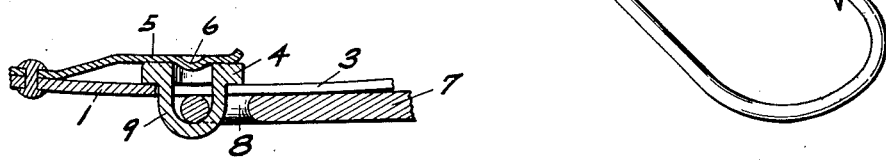
Fig.5
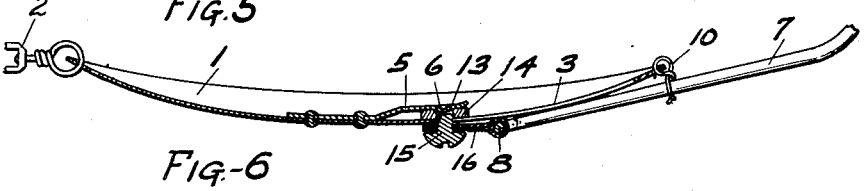
Fig.-6
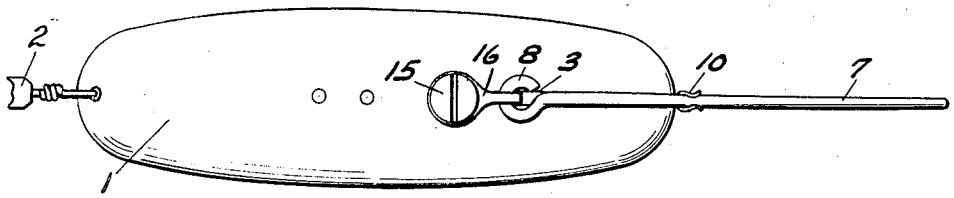
Fig.-7
INVENTOR.
CHARLES T. PFLUEGER
BY
ATTORNEY.

Patented Jan. 29, 1929.

1,700,332

UNITED STATES PATENT OFFICE.

CHARLES T. PFLUEGER, OF AKRON, OHIO, ASSIGNOR TO THE ENTERPRISE MANUFACTURING COMPANY, OF AKRON, OHIO, A CORPORATION OF OHIO.

STRIKER SPOON.

Application filed February 23, 1926. Serial No. 90,011.

This invention relates to trolling spoons for use in fishing, and particularly to spoons in which means are provided for rendering the spoon more effective by securing a striking action when the hook is seized by the fish. The striking action referred to is obtained by mounting the hook in one position upon the spoon so that it will be released momentarily and allowed to travel along the spoon for a short distance, the movement of the hook being abruptly terminated so that the fish is securely impaled upon the hook.

Spoons of this general type are old and well known, the invention being directed to certain improvements in the manner of mounting the hook upon the spoon to secure several advantageous results. Among the beneficial results secured by the forms of the invention shown herein is a more positive spring action than has been secured heretofore. The spoon is easier and cheaper to manufacture than prior forms. It is more easily kept clean and polished. Associated with the device is an attachment by which the hook may be maintained in its proper position upon the spoon so as to insure that the fish, in striking at the spoon, will be caught upon the hook. In the modified form of the device provision is made for detachably mounting the hook so that an injured spoon or hook may be replaced easily.

Other objects and advantages will be apparent to those skilled in the art to which this invention pertains, and it will be understood that, having explained the principles of the invention, modifications and embodiments thereof not shown may be suggested, which come within the scope of the invention and the claims appended hereto.

In the drawings:

Figure 1 is a plan view of the spoon;

Figure 2 is a side view;

Figure 3 is a similar view with the hook at the lowermost point of its travel and in the position to which it is moved after a strike;

Figure 4 is a section on the line 4—4 of Figure 1;

Figure 5 is a detail section through the slide block or button;

Figure 6 is a view of a modified construction showing a slide which may be taken apart for the purpose of removing the hook; and Figure 7 is a bottom plan view of the spoon of Figure 6.

In all of the views the numeral 1 indicates the spoon which is of the usual type except in so far as modified by the present invention. The invention may be applied to other forms of lures than a spoon.

The spoon is attached to the line at one end by the usual swivel 2. The body of the spoon is provided with a longitudinal slot 3 in which is mounted a slide or button 4. The button is free to move in the slot and is releasably held at the upper end of the slot by a flat spring 5, one end of which is fastened on the spoon, preferably on the concave side thereof, the other end lying over the button and being provided with a projection or stud 6 which is received within a recess in the upper face of the button.

The hook 7 is carried upon the button or slide 4 at the rear of the spoon, the eye 8 of the hook being received in the clevis 9 which projects through the slot 3. The construction of the slide or button in the manner shown permits of easy manufacture from a single blank by a boring operation to form the recess axially of the button, and subsequent planing operation on the rear of the button removing the sides thereof, thereby forming the clevis 9 through which the eye of the hook passes.

It will be observed that when the fish strikes the spoon and is caught by the hook, the releasable spring catch permits the slide to travel to the lower end of the slot where the abrupt stoppage of the slide gives the required strike.

In constructions of this type the hook has swung freely from the spoon at all times so that oftentimes the fish will escape because the hook is not adjacent the lure or in the proper position to catch it. In order to prevent this action a light wire spring catch 10 is secured in the lower end of the spoon and engages the shank of the hook, holding it in the position shown in Figure 2, until the hook is struck, whereupon the hook will swing freely from the slide. Other devices may be used for the purpose of retaining the hook temporarily in line with the spoon but that shown is simple and easy to manufacture.

It may be desirable to construct the device so that the hook can be easily removed without opening the eye thereof, a construction for which purpose is shown in Figures 6 and 7 in which the slide or button is made in two parts, 14 and 15, the former having a shank received within the slot 13 and the latter having screw threaded engagement therewith. A clip or keeper 16 is passed over the shank and held between the two parts of the slide, the clip having a loop through which the eye of the hook passes. The projection 6 in the spring enters the opening in the part 15.

The action of the improved spoon is more positive and certain by reason of the fact that the spring bears downwardly upon the head of the slide. The spring cannot be easily bent out of shape and releases the slide quickly.

Other changes and modifications may be made within the scope of the invention which is claimed herein.

What is claimed is:

1. A trolling spoon having a slot formed longitudinally thereof, a slide movable in the slot, a fish hook carried by the slide, means to retain the slide at the upper end of the slot, and a spring clip on the end of the spoon adapted to engage the shank of the hook and hold it releasably in fixed position with respect to the spoon.

2. A trolling spoon having a slot formed longitudinally thereof, a slide movable in the slot, means to retain the slide at the upper end of the slot, and a releasable catch adapted to hold the shank of the hook in fixed relation to the spoon and release the hook when the slide is moved in the slot.

3. A trolling spoon, a fish hook carried thereby, means to releasably hold the eye of the hook near the center of the spoon, and means to releasably hold the shank of the hook along the body of the spoon.

4. A trolling spoon, a fish hook carried thereby, a spring catch to releasably hold the eye of the hook near the center of the spoon, and means to releasably hold the shank of the hook along the body of the spoon.

5. A trolling spoon, a fish hook carried thereby, means to releasably hold the eye of the hook near the center of the spoon, and means to releasably hold the shank of the hook along the convex side of the spoon.

6. A trolling spoon having a longitudinal slot therein, a slide movable in the slot, a recessed head upon the slide at one side of the spoon and a clevis on the slide projecting through the slot, a fish hook carried in the clevis and swinging therein, and a spring catch adapted to hold the shank of the hook against the body of the spoon.

7. A trolling spoon having a longitudinal slot therein, a slide movable in the slot, a recessed head upon one side of the slide, means upon the other side of the slide for attachment of a fish hook, and a spring catch adapted to hold the shank of the hook against the body of the spoon.

8. A trolling spoon having a longitudinal slot therein, a slide movable in the slot, the slide being composed of a head and a screw threaded therein, a keeper secured to the head by said screw, and a fish hook carried by the keeper.

9. A trolling spoon having a longitudinal slot therein, a slide movable in the slot, the slide being detachable so that the hook may be removed.

10. A trolling spoon having a longitudinal slot therein, a slide movable in the slot, and a hook detachably connected to the slide.

11. A trolling spoon, a hook supported by the spoon and an attachment for securing the eye of the hook to the spoon, said attachment being adapted to release the hook without opening the eye thereof.

12. A trolling spoon, a hook, and means to attach the hook to the spoon comprising a head, a screw therein, and a keeper for the hook between the head and the screw.

13. A spoon for the uses set forth comprising a spoon body which is curved transversely, the body having a longitudinal slot therein, a slide movable in the slot, a spring attached at one end to the hollow portion of the spoon, the free end of the spring lying over the slot and movable radially toward and from the spoon, the slide being receivable between the end of the spring and the spoon body, and a fish hook attached to the slide.

14. A spoon for the uses set forth comprising a spoon body having a longitudinal slot therein, a slide movable in the slot, a spring attached to the spoon, the free end of the spring lying over the slot and movable toward and from the spoon, the slide being receivable between the end of the spring and the spoon body, and a fish hook attached to the slide.

CHARLES T. PFLUEGER.